Oct. 14, 1969   J. C. TANNER, JR   3,472,228
APPARATUS FOR PREPARING SKIN GRAFTS
Filed March 15, 1965
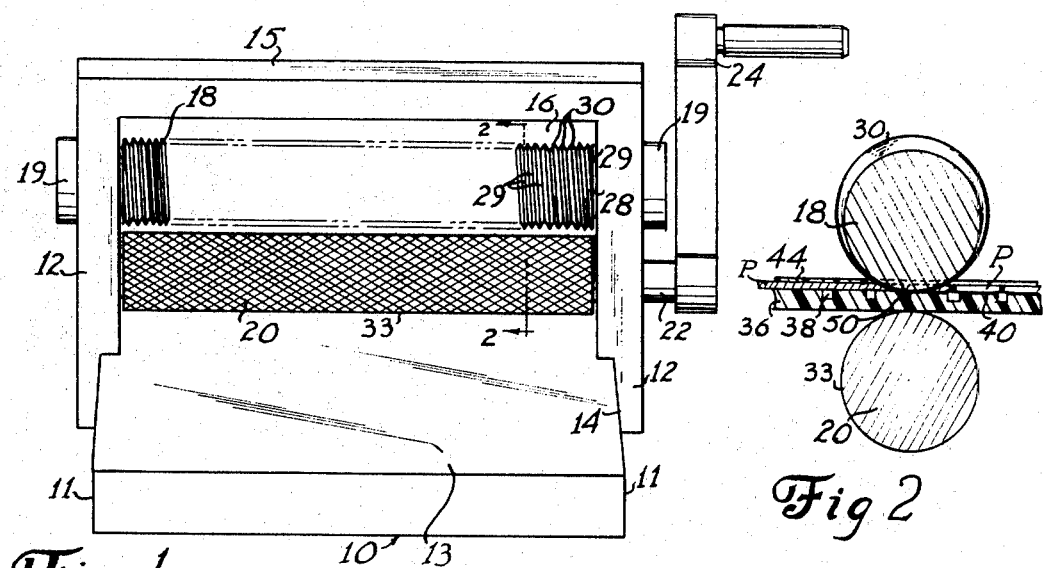
Fig 1
Fig 2
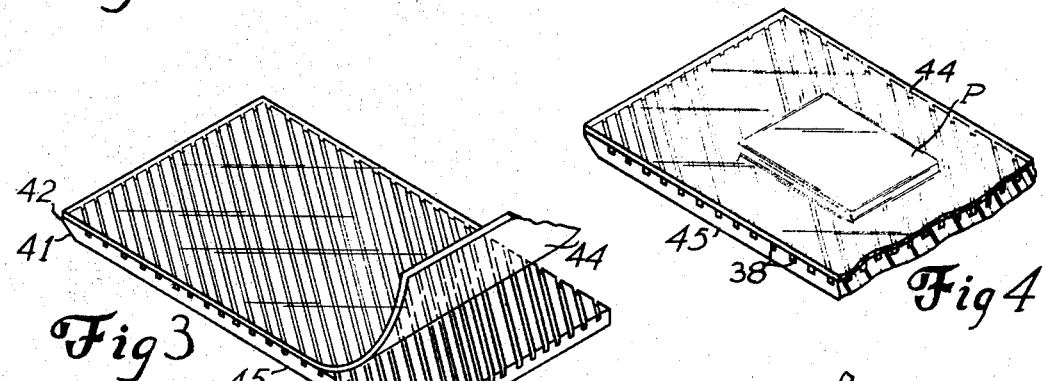
Fig 3
Fig 4
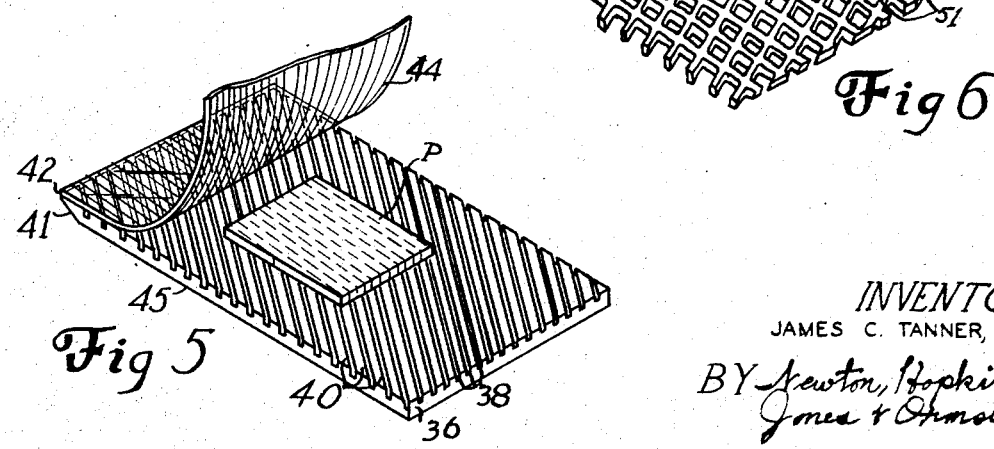
Fig 5
Fig 6
INVENTOR
JAMES C. TANNER, JR.
BY Newton, Hopkins,
Jones & Ormsby
ATTORNEYS 3,472,228
APPARATUS FOR PREPARING SKIN GRAFTS
James C. Tanner, Jr., Suite 1001, 384 Peachtree St.,
Atlanta, Ga. 30308
Filed Mar. 15, 1965, Ser. No. 439,811
Int. Cl. A61b 17/322; B23d 25/02
U.S. Cl. 128—305                                    6 Claims

ABSTRACT OF THE DISCLOSURE

An apparatus for preparing skin graft patches having a plurality of parallel columns of slits with the slits in one column being offset from the slits in adjacent columns so that the skin graft patch is expandable into a mesh. The skin is supported in a plurality of spaced substantially parallel elongated areas or lands and retained thereupon by retaining means and cut by a cutting means only where the skin is supported by the lands.

---

This invention relates to skin grafts and more particularly to a skin graft apparatus for preparing the skin from a donor area for grafting to a recipient area.

Sheet grafts, spaced patch grafts, and spray grafts are well known and have been frequently used in the past to graft skin from one area of a patient's body to another. However, these previous types of skin grafts have serious limitations and disadvantages. For example, sheet grafts using sheets of skin removed from donor areas are limited in usefulness because the recipient areas covered must be substantially the same size as the donor areas from which the sheets of skin are obtained.

Since many recipient areas are relatively large in relation to the possible donor areas from which sheets of skin may be obtained, several sheet grafts are frequently required to cover a single recipient area. This is highly undesirable from the standpoint of the patient. Thus, a sheet graft is useful only where the recipient areas to be covered is relatively small and easily covered by a single sheet of skin obtained from a readily available donor area.

Moreover, sheet grafts tend to be characterized by undesirable accumulations of fluid under the sheet of skin covering the recipient area. These accumulations of fluid under the sheet of skin prevent the initial growing of the sheet of skin to the recipient area and as a result, a sheet graft often requires repeated draining of fluid from under the sheet of skin in order to be successful. This repeated draining of fluid is troublesome and unpleasant to the patient and when accomplished by holes made through the sheet of skin results in a loss of skin which retards healing.

Spaced patch grafts utilize a sheet of skin removed from a donor area and cut into small patches. These small patches of skin are evenly spaced over a recipient area using a carrier sheet and are held in position on the recipient area with the carrier sheet. The spacing between patches of skin permits a larger recipient area to be covered by skin from a donor area than is possible with a sheet graft. Moreover, the relatively small size of the patches of skin and the spacing between the patches of skin avoids the accumulations of fluid often encountered with sheet grafts.

However, the carrier sheet provides very little support to the patches of skin, and a spaced patch graft is very susceptible to trauma and breakdown since the slightest blow is generally sufficient to tear a patch of skin from the recipient area. In addition, since the small patches of skin are simply held against the recipient area by the carrier sheet, no means is provided for holding the patches of skin in tension and they tend to undergo elastic shrinkage. This shrinkage reduces the amount of recipient area covered by the patches of skin and once the patches of skin have started to grow to the recipient area, the shrinkage of the patches of skin tends to tear the skin patches from the recipient area. Thus, the spaced patch graft is a relatively unsatisfactory means for avoiding the limitations of sheet grafts.

Spray grafts utilize skin removed from a donor area in microscopic skin particles. These skin particles are suspended in a suitable liquid and sprayed onto the recipient area. A spray graft allows the recipient area to be of any contour and to be relatively large in comparison to the size of the donor area from which the particles are obtained. A difficulty with the spray graft is that the graft is very susceptible to trauma since any blow is sufficient to tear the skin particles from the recipient area.

Another difficulty encountered with spray grafts is that it is practically impossible to spray the skin particles over the recipient area with a uniform thickness. Moreover, the equipment necessary to obtain the skin particles for a spray graft and to apply the skin particles to a recipient area is complicated and relatively expensive to manufacture. The equipment is also relatively difficult to maintain if sterile conditions are to be achieved and to use if a graft approaching uniform thickness over the recipient area is to be obtained.

The present invention for preparing a sheet of skin from a donor area for grafting to a recipient area comprises, generally, a cutting member having a plurality of spaced cutting edges, and a carrier member which encloses a sheet of skin as the spaced cutting edges of the cutting member penetrates the carrier member and the sheet of skin. The skin graft apparatus disclosed herein produces a plurality of rows of slits in a sheet of skin removed from a donor area as the cutting edges of the cutting member are forced through the carrier member and the sheet of skin. The slits are in parallel rows and the spaces between the slits in one row are opposite the slits in adjacent rows providing a plurality of parallel perforations. The result is a mesh of skin ribbons which may be expanded to cover a recipient area two to three times as large as the donor area.

Since the piece of skin to be prepared for a skin graft is within the carrier member, only the carrier member and that portion of the cutting member penetrating the carrier member and piece of skin must be sterilized prior to use. Thus, the present invention is easy to operate and maintain since little care is necessary to provide a piece of skin for a skin graft under sterile conditions.

The skin graft obtained using the expandable mesh avoids the problems and difficulties of previous skin grafts. Since the expandable mesh has all parts integral with one another, the skin graft has good stability against trauma and breakdown caused by moving or bumping the recipient area. Moreover, the openings between the ribbons of the mesh permit fluid tending to accumulate under the ribbons to drain. This promotes the initial growth of the mesh to the recipient area by avoiding the fluid accumulations encountered with sheet grafts.

The expandable mesh provided by the present invention allows the skin to be evenly spaced over the recipient area without using a carrier sheet. This is because the ribbons of the expandable mesh are evenly spaced over the recipient area as the edges of the mesh are attached to the skin edges surrounding the recipient area. Moreover, since the edges of the mesh are firmly attached to the skin edges surrounding the recipient area, a carrier sheet or other similar holding means is not needed to hold the mesh in place upon the recipient area.

The ribbons of skin which form the mesh are relatively narrow in width. This produces faster healing by improving fluid drainage and causes the ribbons to be elastic. Also, it is well recognized that epithelization takes place only at the edges of the graft. Since there are many edges provided by the mesh, epithelization is rapid to give complete coverage in a relatively short period of time. The elasticity of the ribbons permits them to be slightly in tension when the edges of the mesh are attached to the edges of the skin surrounding the recipient area and serves to hold the mesh in position over the whole recipient area. The elasticity of the ribbons also serves to prevent the shrinkage that has normally been encountered with previous skin grafts.

The method of the present invention includes novel and improved techniques in the perforating or slitting of a donor skin graft patch, procedures for producing the expanded patch, and the donor graft patch itself before and after it is stretched and/or extended to vastly increase the boundary dimensions of the patch, hence the recipient area to which the patch may be effectively applied. Such improved method steps in the preparation of the donor graft patch further lead to novel and improved steps in the application and securement of the graft. The present invention is also concerned with novel and improved graft preparation apparatus and means for the securing and sterile handling of donor patch prior to, during, and after the perforation of the graft and/or its expansion in preparation for its application to the recipient situs.

More specifically, the method of the invention provides for an echelon or staggered type of graft patch perforation or slitting to accomplish an expansible patch substantially similar to that depicted in FIG. 4 of my prior application Ser. No. 337,795. In carrying out the patch preparation method of the present invention the perforating may be variously selected as to lengths and longitudinal spacing with respect to the slits of any given longitudinal row. It is further within the scope of the invention to provide a method by which widely varying perforation patterns, not only as to the relative length of individual slits and longitudinal spacing thereof, but also as to the overlapping transverse interrelationship of the echelons of the patch. With respect to the apparatus of the present invention such apparatus includes a simple, convenient, effective and efficient roller press arrangement by which a donor graft may be perforated in various patterns. The apparatus of the invention further relates to a carrier platen herein characterized by parallel grooves which, in combination with a rotary cutter, may, through modification of the grooves angular relation of the platen during perforation or through blade design, provide for a wide variety of types and arrangements of perforations in the donor graft.

The present inventive concept further embraces the use of the carrier or platen as a convenient and efficient holder for the donor patch, not only for retaining the patch in combination with the platen during the perforating operation but also for a convenient means for the sterile handling of the patch before and/or after the perforation thereof. The present inventive concept further embraces the method and preferred technique of applying the expanded patch as well as the physical structure and mode of operation of the perforating device itself and of the platen carrier.

Numerous other objects and advantages of the present invention will be apparent from consideration of the following specification taken in conjunction with the accompanying drawings in which:

FIG. 1 is a front perspective view of one preferred embodiment of the apparatus for perforating in accordance with the present invention;

FIG. 2 is a detailed section view taken along the lines 2—2 of FIG. 1 which is taken from the valley between two cutting edges at the top of the cutter and extends through an adjacent cutting edge at the bottom of the cutter and including the platen holder and its donor skin patch during perforating operation;

FIG. 3 is a perspective view illustrating the platen with its retaining sheet partially raised to receive a donor patch;

FIG. 4 is a fragmentary perspective view similar to FIG. 3 showing a donor sheet in position under the retainer sheet of the platen;

FIG. 5 is a perspective view illustrating the platen and sheet after perforation, with the cover sheet raised;

FIG. 6 is a view of one type of expanded donor skin patch as formed by the present invention.

The perforating apparatus of the present invention is a simple, practical, effective and efficient structure readily designed to meet the demands of economic manufacture, and one easy to maintain in sterile condition. That form of the apparatus here shown by way of example comprises a generally rectangular base 10 which may be formed of aluminum, stainless steel or appropriate composition such as to withstand conventional sterilization procedures and of sufficient weight and dimension to insure stable support for the device. Vertically mounted at suitable parallel locations along the sides 11 of the base 10 there are provided posts 12, here shown as recessed as at 14 to receive sides 11. Posts 12 are designed to be permanent and in rigid engagement with the base 10, or may be releasably secured in rigid relation by separable fastening means of conventional form (not shown). The upper ends of the posts 12 are preferably joined by a transverse head beam 15 here shown as formed integrally with the upper ends of posts 12. The inner faces of the posts 12 and bottom surface of the head beam 15 define, with the top surface 13 of the base 10, a generally rectangular opening 16 in a plane normal to the top flat surface 13 of the base 10.

Located within the opening 16 approximately midway between the top surface 13 of the base 10 and the lower face of the head beam 15 and extending transversely thereof between the posts 12, there is provided a pair of parallel rollers comprising a knife roll 18 rotatably mounted by end pintles (not shown) which extend into the posts 12 and are secured to end head nuts 19. The posts 12 also rotatably mount therebetween a driving, knurled friction roll 20 spaced from the knife roll 18. Each support for the driving friction roll 20 within the standards 12 (not shown) provides for relative vertical adjustment between the rolls 18 and 20. Various types of rotatable and adjustable bearings are, of course, conventionally available and form in themselves no part of the present invention. On a projecting drive shaft 22 of the driving friction roll 20 is a manual operating handle 24.

The knife roll 18 may be provided with a wide variety of cutting blades by which a donor skin graft patch may be cut as desired. In this respect, it is to be noted that the cutting apparatus here presented may, by simple modification and/or selection of knife roll design and configuration, lend itself to donor skin graft patch formation and application techniques other than the specific expanded patch here shown. In the present instance the roll 18 is provided with helical cutting means exemplified by multiple (here shown as two) screw thread blades 28 and 29, each preferably of sharp V-shaped cross-section to provide helical cutting edges 30. In one presently successful embodiment of the apparatus, the blade edges 30 between each helix are spaced approximately 0.050 inch apart. The pitch of both blades is, of course, uniform, each having ten threads per inch. The pitch here shown is in a right hand direction looking from the right, and the base roll diameter is approximately 1 inch. Other blade contours and configurations may, of course, be used to conform with varying techniques, skin thicknesses, elasticities, patch sizes, and area expansions desirable and/or obtainable.

As above referred to, the friction drive roll 20 is knurled or otherwise provided with a friction surface 33, and the adjustment of spacing between the rolls 18 and 20 is such as to provide a clearance thereabout to receive the grooved carrier platen 36 as it is fed between the rolls by frictional engagement as the feed roll 20 is rotated. The platen 36 is formed, as shown in FIGS. 3, 4, and 5, with transversely inclined parallel grooves 38 defining therebetween intermediate transversely inclined lands 40. The platen 36 is preferably formed of a substantially rigid, but slightly yieldable, material such as plastic. A rectangle of polypropylene of approximately 3 by 12 inches has been successfully employed, the leading or top edge of which is preferably beveled as at 41 to receive thereover a return folded end edge 42 of a thin flexible and easily cut cover sheet 44, the cover sheet being coextensive with the grooved upper face of the platen body 36.

The total thickness of the platen body 36 is somewhat greater than the spacing between the friction drive roll 20 and the knife roll 18. Thus as the platen is fed between the rolls, the cutting edges will engage and cut into the lands 40.

In operation it will be seen that as a platen body 36 bearing upon the surfaces of its lands 40 a donor skin patch, indicated at P in FIGS. 2, 4 and 5, covered by the securing sheet 44 is passed between the rolls 18 and 20, the edges 30 of the helical blades will cut through the cover 44, patch P and into the lands 40. However, the blades will not cut fully through the lands. Hence, upon passage, the patch will be cut at the areas that lie across the lands. Those portions of the patch that are in registration with the grooves 38 will not be cut since they will be depressed into the groove shown in FIG. 2 to constitute the material 50 between the slits and later, upon expansion of the serrated patch, they become the ribbons of the mesh shown in FIG. 6 bounding the mesh apertures 51.

It is, of course, to be understood that the present invention is not limited nor confined to specific sizes, shapes, angularities, or dimensions. However, by way of example, and as a specific teaching of one successful embodiment, the following dimensions have been found successful:

| | Inch, approx. |
|---|---|
| Base Knife Roll (18), diameter | .75 |
| Cutting thread | .10 |
| Friction feed roll (20), max. diameter | .76 |
| Spacing from depth of thread to max. diameter of feed roll | .34 |
| Maximum thickness of platen | .04 |
| Depth of platen grooves | .02 |

By this relationship of dimensions it will be seen that as the platen passes between the rolls, the patch will be cut to provide echelon arrangements of rectilinear slits or perforations spaced by the distance of material overlying each groove in the direction of groove to blade contact.

From the foregoing it is believed that the function and use of the present apparatus will be fully understood as well as the method steps in preparing the donor patch and the nature of the patch itself. The apparatus, the method, the carrier, and the expanded patch have been successfully employed in numerous instances. In practice, split-thickness donor patches are employed. By the use of the present apparatus and method, a one square inch donor patch may provide approximately three square inches of the mesh patch for application to a recipient surface. Sterile techniques are employed and the donor patch is placed on the lands 40 of the grooved platen 36. The sheet 44 is placed over the patch to retain it in position during slitting and to exclude contamination from ambient atmosphere. A temperature below 90 degrees F. should be maintained for carrier platen, patch, and perforating apparatus during operation.

Assuming the original donor patch to be substantially rectangular, it will preferably be laid on the grooved surface of the platen carrier 36 generally in a central position with its sides and ends parallel with the sides and ends respectively of the platen. In practice, a set of three platens is usually provided with each perforating apparatus. Each platen of such a set will be characterized by parallel grooves 38 extending at a different angle across the upper face of the platen from the angularity of the grooves of the other platens. In the present drawings, a median internal angularity of 22.5 degrees from the edges of the platen is shown. In considering the operation of the present apparatus, it may be assumed that the feed of the platen 36 under the cutter roll 18 will be straight, and parallel to the sides of the base 10, and hence in a direction normal to the axis of the rolls 18 and 20. If desired, guide means (not shown) may be provided for maintaining such direction of movement. It will, of course, be recognized that with a platen moving accurately in a direction normal to the axis of the knife roll 18, the helical blades will cut along parallel lines inclined from the direction of platen travel at an angle commensurate with the pitch of the helix of the blades. If perforations accurately parallel with the sides of a donor patch are required, such angularity may be compensated for by either a slight angularity equal to the pitch of the helix in the placement of the patch on the platen and/or an angularity of the platen itself.

Since the grooves 38 separating the lands 40 are at an angle to the direction of movement of the platen carrier 36 and hence at an equivalent angle to the cutter roll 18, the action of the helical blades is to perform successive spaced perforations of the donor patch P where the patch material is in contact with the land. At the grooves, where the patch material has no support beneath the blade edge 30, the material is depressed into the groove, as at 50 in FIG. 2, to form ribbon material bridges 51 between the longitudinal rows of perforations 52. It will be noted that the length of each slit, and the extent of each bridge 51, are controlled by the angularity of the grooves 38, assuming the platen to be moving in a straight path in a direction normal to the axis of the rolls 18 and 20. Thus, with a groove angularity of 22.5 degrees as shown in the drawings, and groove spacings of .075 inch, the slits will be .085 inch long though the land is only .075 inch wide transversely between grooves. Greater angularity of the grooves will reduce the slit length with respect to the direction of travel, toward the minimum of .075 in. (the transverse land width) as the relationship of groove angle to blade helix approaches 90 degrees. The lesser the angle, the greater the slit length and bridge width, hence the provision of multiple platen carriers of differing groove angularities. It is, of course, recognized that a similar selective length of slit and width of bridge may be achieved by a selected angularity of the platen itself as it is passed between the rolls 18 and 20. It is further pointed out that the invention is not limited nor confined to helical screw cutting blades nor straight or uniform grooves and lands of any particular dimensions. Such details are here suggested by way of examples of a particular operative embodiment of the inventive concept.

The expanded area of the donor patch for given sensible factors may be determined by the following formula:

Surface formulae $$S_m = S_I + S_g + E$$
$$= S_I + N \frac{(1)_2}{(2)} + E$$
$$= 1 \text{ sq. in.} + 80 \left(\frac{.210}{2}\right)^2 + E$$
$$+ 1 \text{ sq. in.} + .882 + E$$

$$S_m = 1.882 + E$$
$$= 1.882 + .626$$
$$= 2.508$$

wherein $S_m$ = Maximum surface
$S_I$ = Initial surface
$N$ = Number of slits 1 sq. inch
$l$ = Length of slit
$S_g$ = Surface gained
$E$ = Elasticity Specifications of these blades:

20/in., length of slit 0.210 in. = $l$
4 slits/in., length of gap 0.040 in. = $g$
80 slits/sq. in., width between blades 0.050 in. = $d$ In preparing the donor skin patch for expansion in accordance with the present invention, split patch P is placed on the platen 36 as hereinbefore referred to and covered by the sheet 44 by which it is retained in position. The beveled edge 42 is then inserted between the rolls 18 and 20 and the crank 24 turned whereby the knurled roll 20 feeds the platen under the cutter 18 whereby the perforations are performed in the manner stated. A temperature below 90 degrees F. is maintained during the entire procedure. A slight shrinkage of the patch area occurs prior to the perforating; however, no stretching of the patch is required prior to the perforating. The patch in its normal, slightly shrunken condition is simply placed smoothly upon the lands 40 of the platen and retained thereon under the sheet 44. After the perforating operation, the patch is expanded by stretching in a direction substantially transverse of the parallel rows of perforations. Of course, the patch can be stretched in a direction parallel to the slits to provide the same expansion. The patch would then be pulled in a transverse direction to open the now-expanded slits of the patch.

In this initial expansion of the perforated patch, the skin is stretched beyond its elastic limit so that a permanent expansion of the live skin is effected. Thus, a perforated patch may be initially expanded substantially beyond three times the transverse dimension of the original patch whereupon relaxation will permit the donor patch to retain a dimension about three times the original dimension, with a longitudinal diminution of somewhat less than 20 percent. It has been found that a type of perforation and a degree of expansion producing substantially square openings, as at 51 in FIG. 6, will effect a maximum expanded area.

After the perforated and over-expanded patch has returned from its over-expanded condition to the relaxed expanded condition, it may again be expanded when applied to the recipient area. The following chart indicates the type of area changes which have been experienced.

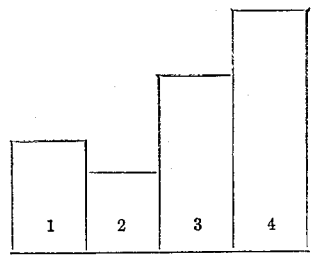

(1) Donor area
(2) Graft-area after shrinkage
(3) Expanded graft area without elasticity
(4) Expanded graft area with elasticity In use the expanded donor patch of split thickness graft is placed in a fresh, raw and granulating recipient area. The mesh is sewn on with a running 0000 chromic catgut suture to the borders of the wound and is best fixed in place with a gluing technique. A mild compressive dressing is applied. The mesh has been found to take and grow as other grafts do, and epithelization of the open spaces is complete in approximately ten days. Take is enhanced by the absence of fluid accumulation under the graft. Rapid epithelization is related to the huge increase in graft border surface produced by the numerous slits. The phenomenon explains the absence of graft constrictions. The fact that the skin adnexae are evenly distributed over the grafted area insures stability against trauma and breakdown.

In the practice of the invention both as to method, apparatus and operation changes, modifications and technical use of equivalents may be resorted to without departure from the spirit or scope of the invention as defined in the appended claims.

I claim:

1. In an apparatus for forming a plurality of intermittent slits in a piece of skin, a base member having a plurality of grooves defining a plurality of spaced, substantially parallel and flattened lands, retaining means for retaining a piece of skin in position across said lands, and a cutting roll having a helical cutting blade for cutting through said piece of skin in each of a plurality of substantially parallel lines of motion obliquely disposed to said plurality of lands.

2. The apparatus of claim 1 in which said retaining means is a relatively thin flexible sheet fixedly attached to an edge of said base member and positionable over said lands.

3. The apparatus of claim 1 in which said lands are of a substantially uniform height and in which said cutting means cuts through said piece of skin and into said lands to a depth which is less than said height.

4. The apparatus of claim 3 in which the difference between said depth and said height is greater than the thickness of a piece of skin.

5. The apparatus of claim 1 in which the angle formed between said lands and said lines of motion is substantially less than ninety degrees.

6. Apparatus for forming a plurality of intermittent slits in a piece of skin comprising:
 (a) a base member having side edges and a plurality of grooves obliquely disposed to said side edges and defining a plurality of spaced, substantially parallel and flattened lands;
 (b) retaining means for retaining a piece of skin between said retaining means and said base member in a position across said lands; and
 (c) a cutting roll having at least one continuous cutting blade for cutting through said retaining means and through said piece of skin only where positioned over said lands in each of a plurality of substantially parallel lines of motion obliquely disposed to said plurality of lands.

References Cited

UNITED STATES PATENTS

| | | | |
|---|---|---|---|
| 671,915 | 4/1901 | Curtis | 83—332 |
| 1,577,621 | 3/1926 | Gammeter | 83—342 |
| 1,693,589 | 12/1928 | Bolton | 83—342 |
| 2,221,716 | 12/1940 | Morton | 83—342 |
| 3,076,461 | 2/1963 | Meek et al. | 128—305 |
| 3,076,462 | 2/1963 | Meek et al. | 128—305 |

OTHER REFERENCES

"Skin Grafting of Burns" by Brown and McDowell, June 1944. Pages 61 and 62 relied upon.

F. BARRY SHAY, Primary Examiner

G. E. McNEILL, Assistant Examiner

U.S. Cl. X.R.

83—332